J. G. OLIVER.
LATHE CHUCK.
APPLICATION FILED JAN. 14, 1909.

926,761.

Patented July 6, 1909.
2 SHEETS—SHEET 1.

Witnesses.
E. B. Gilchrist
H. R. Sullivan

Inventor.
John G. Oliver
by Thurston T. Woodward
his attorney

UNITED STATES PATENT OFFICE.

JOHN G. OLIVER, OF CLEVELAND, OHIO, ASSIGNOR TO BARDONS AND OLIVER, OF CLEVELAND, OHIO, A PARTNERSHIP.

LATHE-CHUCK.

No. 926,761.   Specification of Letters Patent.   Patented July 6, 1909.

Application filed January 14, 1909. Serial No. 472,166.

*To all whom it may concern:*

Be it known that I, JOHN G. OLIVER, a citizen of the United States, residing at Cleveland, in the county of Cuyahoga and State of Ohio, have invented a certain new and useful Improvement in Lathe-Chucks, of which the following is a full, clear, and exact description.

This invention relates particularly to means by which the chuck of the lathe may be caused to grasp and release the work.

The object of the invention is to provide novel and efficient means for this purpose, and for additionally cleaning the chips from the chuck jaws, and, in some cases, for removing the work from the chuck jaws.

The invention consists in the construction and combinations of parts hereinafter described and pointed out definitely in the claims.

Figure 1:
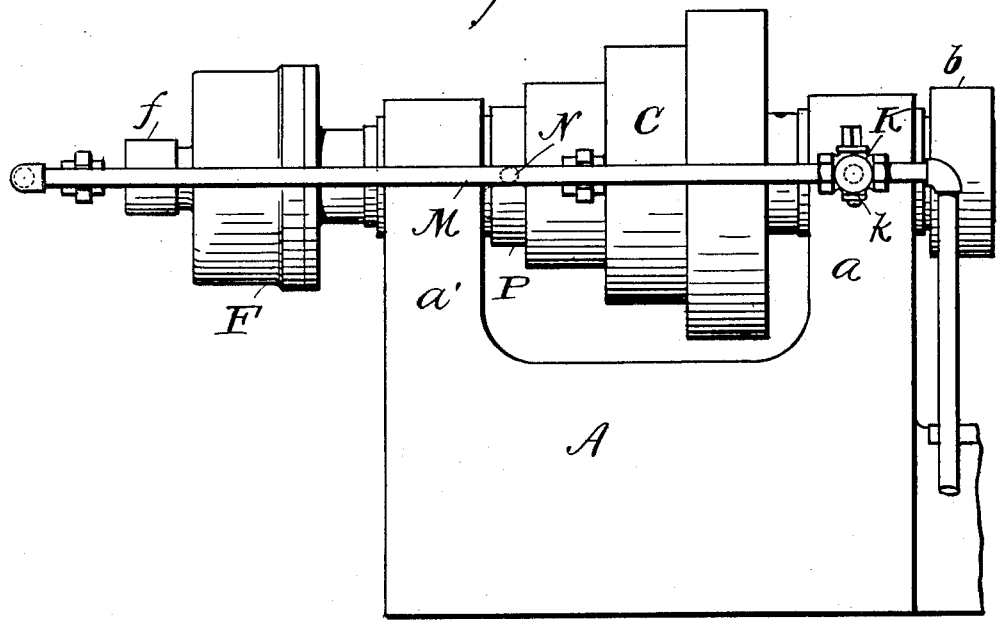
Figure 2:
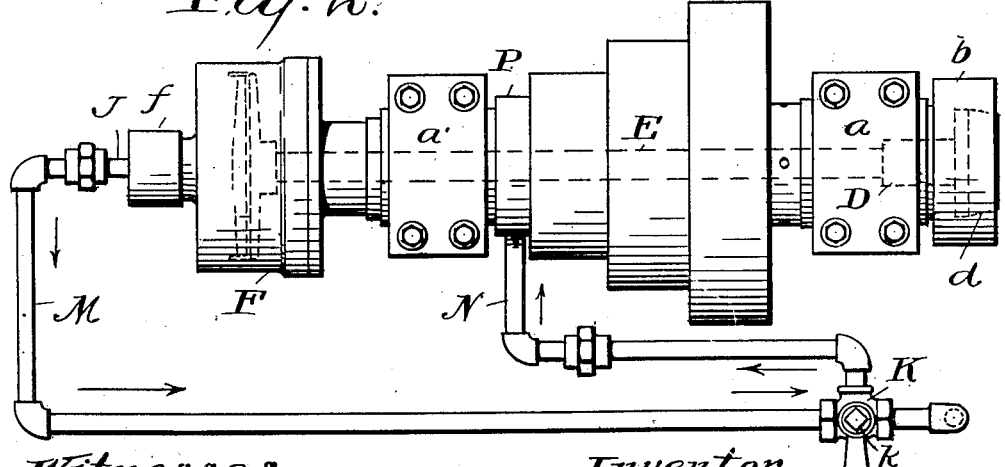
Figure 3:
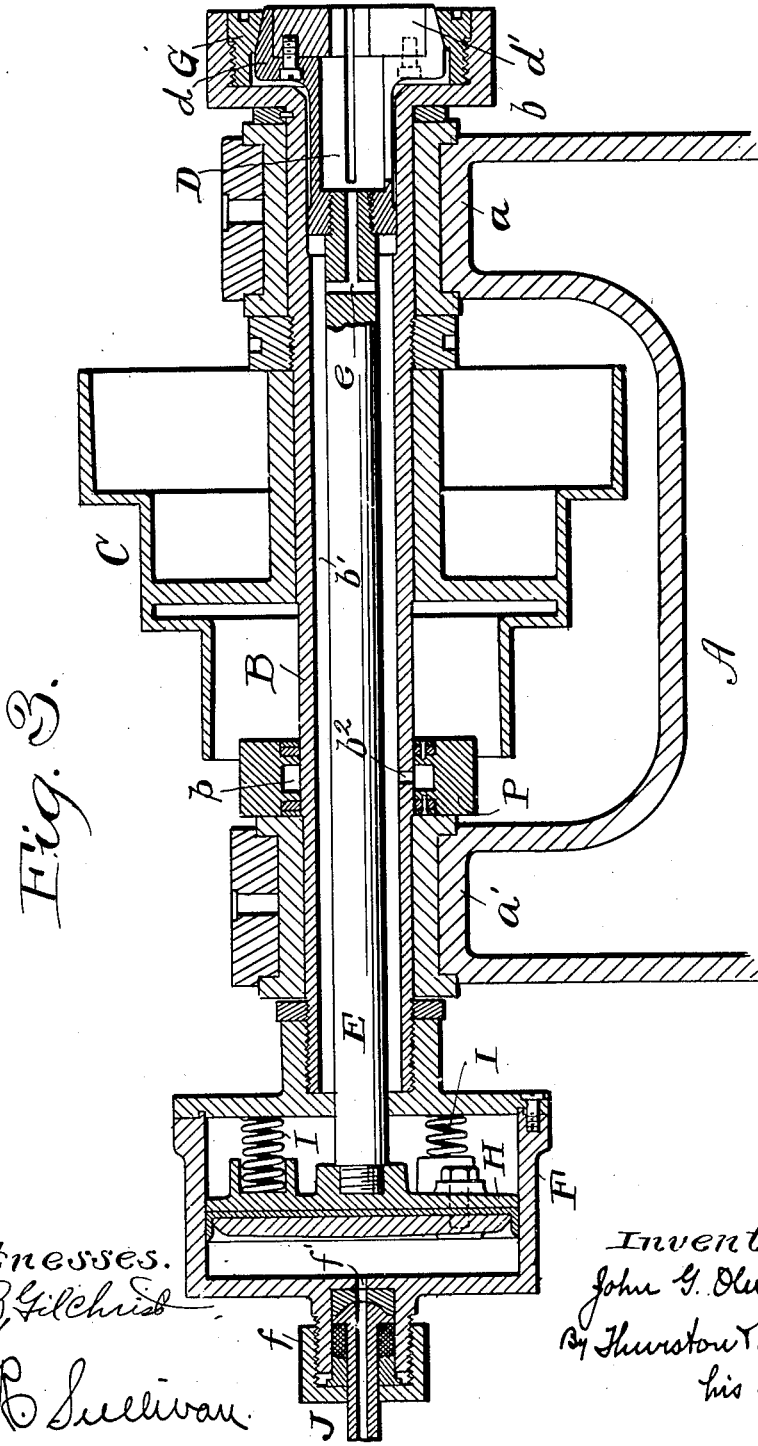

In the drawing, Figure 1 is a front view of the part of a lathe embodying the invention. Fig. 2 is a plan view of the same parts and Fig. 3 is a central vertical longitudinal section thereof.

Referring to the parts by letters, A represents an ordinary head stock of a lathe; and $a$, $a'$ two standards which are parts thereof. B represents the tubular live spindle which is rotatably mounted in bearings on said standards. This spindle may be rotated by any suitable means, as, for example, the cone pulley C secured thereon. The chuck for holding work is mounted in the front end of this spindle, and may be of any well known or suitable construction adapted to be operated in the manner hereinafter specified. The chuck as shown is part of a tubular collet D slit longitudinally from its front end rearward, thereby forming a plurality of spring jaws $d$. The front or jaw end of the collet is preferably enlarged and externally tapered, as shown, and lies within an oppositely tapered ring G which is screwed into the enlarged end $b$ of the spindle B. When the collet, whose rear end is slidably fitted within the spindle D, is moved forward the engagement of the oppositely inclined surfaces on the chuck jaws and ring G force said jaws inward and cause them to grip the work. Chuck blocks $d'$ formed to properly grasp the work are secured to the chuck jaws. This particular form of chuck is well known in this art. It lends itself admirably to use with the mechanism constituting the novel features of the mechanism now to be described, for operating it; but any other form of chuck adapted to be operated by said mechanism may be employed in its stead.

Within the tubular spindle is the chuck rod E, the front end of which is screwed into the rear end of the collet. The rear end of this rod enters a cylinder F formed upon or secured to the rear end of the spindle B. Within this cylinder is a nicely fitting piston H to which the chuck rod is rigidly fastened. Springs I within the cylinder exert constantly a force tending to push the piston rearwardly within said cylinder, whereby the collet is drawn rearward and its jaws allowed to open.

A non-rotating coupling pipe J is rotatably fitted within an axially disposed stuffing box $f$ on the rear end of the cylinder F, and through this coupling pipe and a port $f'$ in the rear end of the cylinder, compressed air or other pressure fluid may be discharged into the rear end of said cylinder behind the piston. A pipe M is connected to this coupling pipe J and leads therefrom to the valve casing K in which is a three-way valve $k$. Another pipe N leads from this valve casing and is connected with a collar P which embraces the spindle but does not rotate with it. Within this collar is an annular recess $p$ with which the pipe N is in free communication. In the spindle B is an opening $b^2$ which establishes communication between the annular recess $p$ and an annular recess $b'$ within the spindle around the chuck rod E. A duct $e$ in the front end of the chuck rod establishes communication between this annular space $b'$ and the tubular center of the collet D.

The operation and function of the described mechanism is as follows: After the operator has put a piece of work into the embrace of the chuck, he turns the valve $k$ so as to admit the pressure fluid into the cylinder F behind the piston. The piston is immediately driven forward, pushing rod E and the collet D until the jaws of the latter close upon the work. This condition is maintained until the work has been machined; and then the operator turns the valve $k$ so as to open up communication between the pipes M and N, at the same time closing communication with the source of the pressure fluid. Immediately the pressure fluid, which has been imprisoned in the cylinder and pipe M, is allowed to flow out of the cylinder through pipe M, valve casing K and pipe N into the annular chamber $p$ and thence into the annular space $b'$ in the spindle, and therefrom, through duct $e$, into the center of the collet. As soon as the valve is turned, as stated, the springs I force the piston H rearward thereby permitting the collet jaws to open. As the pressure fluid flows into the collet, it will, if the work embraced by the chuck is of proper shape, eject the work from the chuck. In any event, whether the work is blown out or whether it is removed by the operator, the pressure fluid flowing into the collet will blow out of the chuck any chips which may have dropped and clung thereon.

Having described my invention, I claim:

1. In a lathe, the combination of the live spindle, a chuck mounted in its front end, a spring exerting its force to open the chuck, and a fluid pressure device for closing the chuck, with valve controlled means for admitting pressure fluid into said fluid pressure device and for exhausting the pressure fluid therefrom and conducting it to and discharging it into the rear end of the chuck.

2. In a lathe, the combination of the tubular live spindle, a chuck mounted in its front end, a fluid pressure cylinder on the rear end of the spindle, a piston therein, and a chuck rod intermediate of the piston and chuck, with valve controlled means adapted to discharge pressure fluid into the cylinder behind the piston and to conduct the exhaust from said cylinder into the spindle in front of the cylinder,—there being a duct leading from the piston to the open center of the chuck.

3. In a lathe, the combination of a tubular live spindle having a fluid pressure cylinder on its rear end, a chuck mounted in the front end of said spindle, a rod connected with said chuck and extending through the spindle into the cylinder, a piston in said cylinder to which said rod is connected, and a non-rotating coupling pipe axially mounted in the rear end of the cylinder and communicating with the interior thereof, with a valve casing containing a three-way valve, a pipe connecting said valve casing and coupling pipe, a non-rotating collar embracing the spindle and containing an annular recess, a pipe connecting said recess with the valve casing, said spindle having a hole through its wall communicating with said recess and there being a duct leading from the interior of the spindle to the open center of the chuck.

In testimony whereof, I hereunto affix my signature in the presence of two witnesses.

JOHN G. OLIVER.

Witnesses:
E. L. THURSTON,
H. R. SULLIVAN.